United States Patent [19]
Baratin

[11] 4,119,806
[45] Oct. 10, 1978

[54] SUBSCRIBER'S LINE EQUIPMENT FOR A TELEPHONE EXCHANGE

[75] Inventor: André N. Baratin, Neuilly-sur-Seine, France

[73] Assignee: Jeumont-Schneider, Puteaux, France

[21] Appl. No.: 857,901

[22] Filed: Dec. 6, 1977

[30] Foreign Application Priority Data
Dec. 17, 1976 [FR] France .................. 76 38031

[51] Int. Cl.$^2$ ...................... H04M 19/00; H04B 1/58
[52] U.S. Cl. ................................. 179/18 FA; 179/77; 179/170 NC
[58] Field of Search ............. 179/18 FA, 84 A, 2.5 R, 179/170 NC, 84 R, 18 F, 81 R, 81 A, 77

[56] References Cited
U.S. PATENT DOCUMENTS
4,011,410  3/1977  Thomas .................. 179/2.5 R Primary Examiner—Thomas A. Robinson
Attorney, Agent, or Firm—Bacon & Thomas

[57] ABSTRACT

A subscriber's line equipment for a telephone exchange for replacing equipment comprising a telephone transformer or chopper, comprises a telephone line supply circuit comprised of two constant d.c. voltage sources, a transistor functioning as a constant current generator, a transformer connected to rectifying means, two transmitters connected to the primary winding of the transformer, a closed loop detecting circuit and receiving and transmitting circuits connected to receive and transmit signals to the telephone exchange.

1 Claim, 1 Drawing Figure

U.S. Patent  Oct. 10, 1978  4,119,806
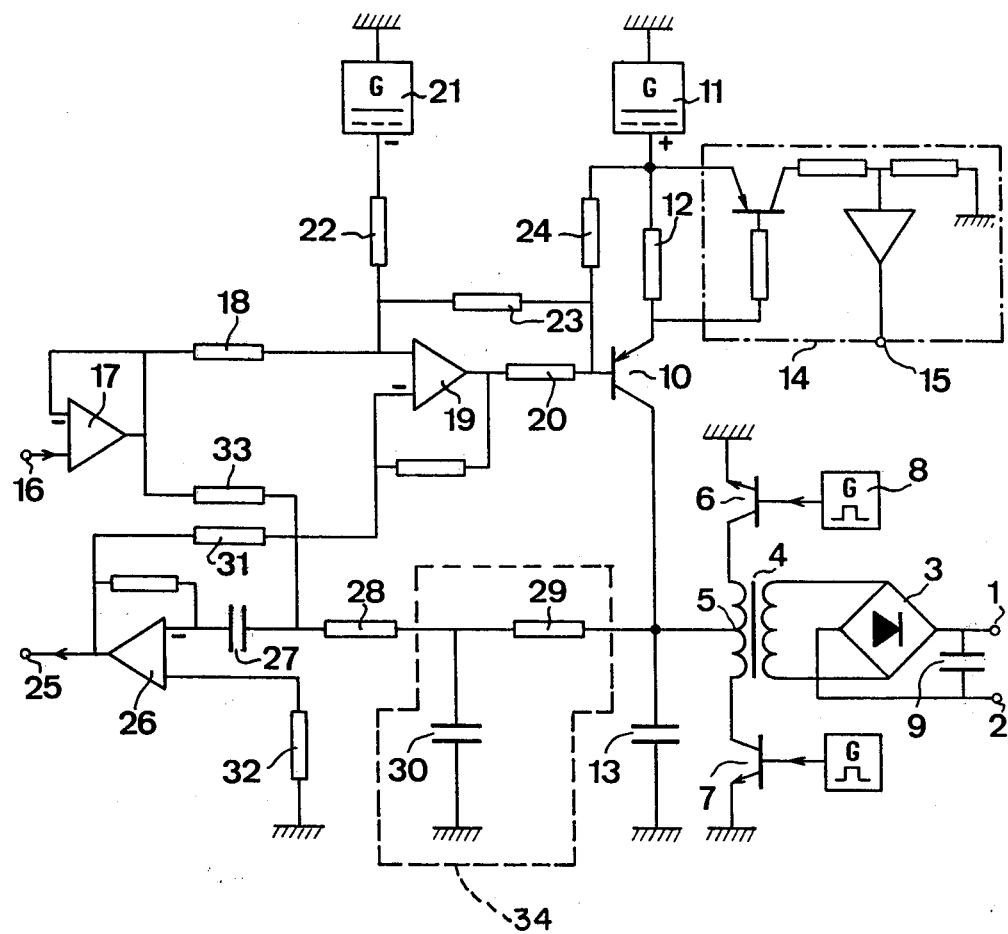

SUBSCRIBER'S LINE EQUIPMENT FOR A TELEPHONE EXCHANGE

BACKGROUND OF THE INVENTION

The invention relates to subscriber's line equipment for a telephone exchange comprising a two-wire-to-four wire conversion circuit, a circuit for supplying d.c. to the subscriber's line, and a closed loop detection circuit. The equipment can be supplemented in a known manner by a circuit for transmitting the ringing signal and a device for limiting the ringing current in the event of a shortcircuit on the subscriber's line.

In conventional subscriber's line equipment, use is normally made of a telephone transformer for two wire-to-four wire conversion, or sometimes use is made of a telephone frequency or voice frequency transformer (simpler and less bulky than a telephone transformer), a 48 V supply bridge, a current-limiting device and a closed-loop detecting means. Such equipment has the disadvantage of being bulky and expensive.

The equipment according to the invention does not have any of the aforementioned disadvantages since it does not comprise either a telephone transformer or a telephone-frequency transformer, but uses a ferrite-core transformer for higher frequencies. The ferrite-core transformer is less expensive and bulky and ensures complete galvanic decoupling of the subscriber's line, without any common point with the exchange supply source.

The equipment is of use more particularly in electromechanical or electronic telephone exchanges.

The equipment according to the invention is characterised in that it comprises:

A subscriber's line equipment for a telephone exchange, comprising:

a circuit for supplying direct current to the subscriber's line, which comprises:
first and second constant direct current sources, wherein:
the negative terminal of said first source is connected to ground, and
the positive terminal of said second source is connected to ground;
a step-up transformer having a ferrite core, with intermediate tapping of the primary winding, and primary winding terminals;
two pulse generators of rectangular pulses, each having a duty factor of 0.5 and a repetition radio frequency;
a first PNP transistor being connected as a current generator, in series with said first current source, whereby:
the collector of said transistor is connected to the intermediate tapping of said transformer;
the emitter of said transistor is connected, by a first resistor, to the positive terminal of said first source;
the base of said transistor is connected, by a second resistor, to the positive terminal of said first source;
a third resistor, connected between the base of said first transistor and, by a fourth resistor, to the negative terminal of said second source;
two NPN transistors having a common emitter connector, whereby:
the collectors of said transistors are respectively connected to said primary winding terminals of said transformer;
the bases of said transistors are respectively connected to the output of the pulse generators; and
the emitters of said transistors are connected to ground; and
rectifying means connected to the transformer secondary winding for supplying direct current to the subscriber's line;
a first filtering capacitor shunting the subscriber's line; and
a second high-frequency decoupling capacitor, connected between ground and said intermediate tapping of said transformer primary winding; and
a first circuit for transmitting voice signals from the telephone exchange to the subscriber's line, having an impedance-matching, unit-gain buffer amplifier at its input connected by a fifth resistor to a current generator comprising a first differential amplifier having a negative-feedback loop connected to the base of said first transistor by a sixth resistor, and wherein said third resistor comprises a positive-feedback resistor;
a second circuit for transmitting voice signals from the subscriber's line to said telephone exchange, comprising a low-pass filter having a seventh resistor and a third capacitor, wherein said seventh resistor is connected between the intermediate tapping of said transformer and the negative input of a second differential amplifier by an eighth resistor in series with a fourth capacitor, whereby said second differential amplifier has a negative feedback loop;
a ninth resistor, for providing an anti-side tone effect, being connected between the output of said buffer amplifier and the connection between said fourth capacitor and said eighth resistor; and
a tenth resistor, for matching the impedance relative to the telephone line, being connected between the output of said second differential amplifier and the negative input of said first differential amplifier.

BRIEF DESCRIPTION OF THE DRAWING

The invention will be more clearly understood from the embodiment and the single accompanying drawing, which shows the electric circuit of subscriber's line equipment for a telephone exchange. To maintain the clarity of the drawing, the ringing current transmission circuit and the telephone exchange have not been shown.

In the drawing, the subscriber's line is indicated by its two terminals 1 and 2, which are connected to the outputs of a full-wave rectifier means 3, the inputs of which are connected to the secondary terminals of a ferrite-core step-up transformer 4 having an intermediate tapping 5 brought out of the primary winding.

Two NPN transistors 6 and 7 having a common emitter connection have their collectors connected to the primary terminals of transformer 4 and their bases each connected to a generator 8 of rectangular pulses having a duty factor of 0.5 and a repetition radio frequency.

A capacitor 9 is connected between terminals 1 and 2. A PNP transistor 10 connected as a current generator, has its emitter connected via a resistor 12 to the positive terminal of a source 11 of d.c. voltage which is constant (or kept constant by known regulating means). The negative terminal of source 11 is grounded. The collector of transistor 10 is connected to the intermediate tapping 5 of transformer 4. A capacitor 13 is connected between tapping 5 and ground.

A known threshold detector 14 is connected to the terminals of resistor 12 and its output 15 delivers an output signal, the level of which indicates the state of the subscriber's line loop.

Voice signals from the telephone exchange en route for the subscriber's line arrive at terminal 16 and are processed by a transmission circuit comprising a unit-gain impedance-matching buffer amplifier 17 whose output is connected, via a resistor 18, to the positive input of a differential amplifier 19 having a negative feedback loop.

The output of amplifier 19 is connected to the base of transistor 10 via a resistor 20.

A constant d.c. source 21 has its positive terminal connected to ground, whereas its negative terminal is connected to the positive input of amplifier 19 by a resistor 22. A positive feedback resistor 23 for amplifier 19 is connected between the positive input of amplifier 19 and the base of 10. A resistor 24 is connected between the base of 10 and the positive terminal of d.c. source 11.

Voice signals from the subscriber's line en route for the telephone exchange are processed by a transmission circuit connected to the exchange by terminal 25 and comprising a negative feedback loop amplifier 26 whose output is connected to 25 and whose negative input is connected to the intermediate tapping 5 of transformer 4 via a capacitor 27 (to stop the d.c. component) in series with a resistor 28 and a low pass filter 34, whose output is connected to the intermediate tapping 5 of transformer 4. The filter 34 comprises a resistor 29 and a capacitor 30, which capacitor is connected between the resistors 28 and 29 and ground. The output of amplifier 26 is connected to the negative input of differential amplifier 19 by a resistor 31 in order to match the output impedance between terminals 1 and 2. The positive input of amplifier 26 is connected to ground by a resistor 32.

The output of amplifier 17 is connected between capacitor 27 and resistor 28 by a resistor 33 in order to produce an anti-side tone effect at the output of amplifier 26.

The equipment shown in the drawing operates as follows:

Transistors 6 and 7 are cyclically controlled so that each transistor is alternately in the conductive or non-conductive state, and they are never in the same state together.

The voltage connected at the secondary winding of the transformer 4 is alternating, since the terminals of the primary winding of 4 alternately change from the most negative voltage (the ground potential of the emitters of NPN transistors 6 and 7) to the most positive voltage (the collector potential of PNP transistor 10).

Capacitor 13 is for high-frequency decoupling of transformer 4. Its capacity is such that it does not cause attenuation at voice frequencies.

The two rectangular control signals from the generators 8 are supplied by a time base. Rectifier 3 can rectify the square signal at its input.

Capacitor 9 filters the output voltage. Capacitor 9 has a low capacitance, to prevent any appreciable attenuation of the voice-frequency signals.

Transistor 10 is connected as a current generator. The current in its collector depends only on the voltage at the terminals of resistor 24 and the value of resistor 12. Resistor 12 provides negative current feedback.

Transistor 10 forms part of the circuit for transmitting the voice signals from terminal 16. The voltage at the terminals of resistor 24 is directly proportional to the current through it, i.e., to the output signal of the current generator formed by amplifiers 17 and 19, source 21 and resistors 18, 20, 22, 23.

The generator current is proportional to the voltage at the terminals of resistor 18 which in turn is proportional to the voice signal transmitted at terminal 16.

The current in transistor 10 is not influenced by any variation in the potential of the positive terminal of source 11, since it acts both on the base of 10 via resistor 24 and on the emitter of 10 via resistor 12.

The negative terminal of source 21 is used to fix the inoperative point of the base of transistor 10. The voltage of source 21 is carefully filtered so that it does not introduce any additional interfering noise into the line.

First case

The subscriber's line at terminals 1 and 2 is open and the equipment is inoperative.

The bases of transistors 6 and 7 receive pulses from the two generators 8, which chop the voltage between the terminals of the primary winding of transformer 4. The transformation ratio of transformer 4 is such that a d.c. voltage of approx. 48 V appears between terminals 1 and 2. The current supplied by transistor 10 is used only to compensate losses in the circuit; it is insufficient to release the transistor in threshold detector circuit 14. Consequently the output signal at output 15 is zero, indicating an open loop.

Second case

The subscriber's line at terminals 1 and 2 is looped to a subscriber's telephone set.

The current flowing in the line causes an increase in the current in transistors 6 and 7. Consequently, the transistors in threshold detector circuit 14 begin to supply power and a signal appears at the output 15, indicating a closed loop. Resistors 12, 24 and 31 have been chosen so that the impedance, relative to line at terminals 1 and 2, is 600 ohms.

Third case

The subscriber's line at terminals 1 and 2 is short-circuited.

Since transistor 10 acts as a current generator, the voltage at terminals 1 and 2, in dependence on the current, has a rectangular characteristic, which means that the d.c. current in the line is constant irrespective of the load on the line and the length — i.e., the short-circuit is tolerated.

Fourth case

The exchange transmits a voice signal at terminal 16.

A low-frequency signal appears at terminal 16 and causes a variation in the current of the primary winding of transformer 4 and a consequent variation in the voltage between terminals 1 and 2, proportional to the line impedance. Connection 27–28 receives (a) the signal from amplifier 17 via resistor 33 and (b) the signal transmitted by the collector of transistor 10 via resistors 29 and 28. These signals have opposite polarity and therefore cancel out and are not transmitted to the output of amplifier 26 — i.e., they have an anti-side tone effect.

Fifth case

The subscriber's line at terminals 1 and 2 transmits a voice signal to the telephone exchange.

The variation in the resistance of the subscriber's microphone connected to the line at terminals 1 and 2 results in a variation in the load on the secondary winding of transformer 4 and a variation in the voltage of the primary winding of transformer 4, allowing for the impedance. The same variation in voltage occurs at the terminals of capacitor 13. It is transmitted to the negative input of amplifier 26, via a low-pass filter 34, resistor 28 and capacitor 27.

The amplifier 26 transmits the resulting amplified voltage variation (a) to the telephone exchange via terminal 25 and (b) via resistor 31 to the negative input of amplifier 19. The resistor 31 between amplifiers 19 and 26 is for matching the impedance relative to the terminals of capacitor 13. Without resistor 31, the impedance will be very large, since transistor 10 operates as a current generator.

The impedance between terminals 1 and 2 is accurately determined and matched with the line impedance over the entire range of telephone frequencies.

The low-pass filter 34 can be used to eliminate any residual high frequency at the terminals of 13, thus preventing the high frequency from being amplified by amplifier 26 but transmitting the voice-frequency signals.

Capacitor 27 cuts off the d.c. voltage at the terminals of 13, so that it is not amplified.

The capacitance of the capacitor 27 is such that its corresponding impedance does not affect the gain of amplifier 26.

Subscriber's line equipment for a telephone exchange, characterised in that it comprises:

I claim:

1. A subscriber's line equipment for a telephone exchange, comprising:
   a. a circuit for supplying direct current to the subscriber's line, which comprises:
      1. first and second constant direct current sources, wherein:
         I. the negative terminal of said first source is connected to ground; and
         II. the positive terminal of said second source is connected to ground;
      2. a step-up transformer having a ferrite core, with intermediate tapping of the primary winding, and primary winding terminals;
      3. two pulse generators of rectangular pulses each having a duty factor of 0.5 and a repetition radio frequency;
      4. a first PNP transistor connected as a current generator, in series with said first current source, wherein:
         I. the collector of said transistor is connected to the intermediate tapping of said transformer;
         II. the emitter of said transistor is connected, by a first resistor, to the positive terminal of said first source;
         III. the base of said transistor is connected, by a second resistor, to the positive terminal of said first source, and
      5. a third resistor, connected between the base of said first transistor and, by a fourth resistor, to the negative terminal of said second source;
      6. two NPN transistors having a common emitter connection, wherein;
         I. the collectors of said transistors are respectively connected to said primary winding terminals of said transformer;
         II. the bases of said transistors are respectively connected to the output of the pulse generators; and
         III. the emitters of said transistors are connected to ground; and
      7. rectifying means connected to the transformer secondary winding for supplying direct current to the subscriber's line;
      8. a first filtering capacitor shunting the subscriber's line; and
      9. a second high-frequency decoupling capacitor, connected between ground and said intermediate tap of said transformer primary winding; and
   b. a first circuit for transmitting voice signals from the telephone exchange to the subscriber's line, having an impedance-matching, unit-gain buffer amplifier at its input connected by a fifth resistor to a current generator comprising a first differential amplifier having a negative-feedback loop connected to the base of said first resistor by a sixth resistor, and wherein said third resistor comprises a positive-feedback resistor;
   c. a second circuit for transmitting voice signals from the subscriber's line to said telephone exchange, comprising a low-pass filter having a seventh resistor and a third capacitor, wherein said seventh resistor is connected between the intermediate tapping of said transformer and the negative input of a second differential amplifier by an eighth resistor in series with a fourth capacitor, whereby said second differential amplifer has a negative feedback loop;
   d. a ninth resistor, for providing an antiside tone effect, being connected between the output of said buffer amplifier and the connection between said fourth capacitor and said eighth resistor; and
   e. a tenth resistor, for matching the impedance relative to the telephone line, being connected between the output of said second differential amplifier and the negative input of said first differential amplifier.

* * * * *